(12) United States Patent
Sugiyama (10) Patent No.: US 10,948,800 B2
(45) Date of Patent: Mar. 16, 2021

(54) OPTICAL MODULATOR WITH AN OPTICAL WAVEGUIDE PARTIALLY FOLDED BACK AND OPTICAL MODULE WITH THE OPTICAL MODULATOR

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 0 days.

(21) Appl. No.: 16/150,880

(22) Filed: Oct. 3, 2018

(65) Prior Publication Data
US 2019/0187536 A1   Jun. 20, 2019

(30) Foreign Application Priority Data
Dec. 20, 2017  (JP) .............................. JP2017-244221

(51) Int. Cl.
*G02F 1/225* (2006.01)
*G02B 6/125* (2006.01)
*G02B 6/12* (2006.01)

(52) U.S. Cl.
CPC ............ *G02F 1/225* (2013.01); *G02B 6/125* (2013.01); *G02B 2006/12119* (2013.01); *G02B 2006/12142* (2013.01)

(58) Field of Classification Search
CPC ................................. G02B 6/125; G02F 1/225
See application file for complete search history.

(56) References Cited

U.S. PATENT DOCUMENTS

| 7,758,946 | B2* | 7/2010 | Maki | D03D 11/00 |
| | | | | 428/113 |
| 7,817,879 | B2* | 10/2010 | Sugiyama | G02B 6/12007 |
| | | | | 385/131 |
| 9,515,000 | B2* | 12/2016 | Ishii | G01R 1/06716 |
| 2002/0081055 | A1* | 6/2002 | Painter | B23K 26/40 |
| | | | | 385/2 |
| 2003/0003736 | A1* | 1/2003 | Delwala | G02B 5/045 |
| | | | | 438/689 |
| 2004/0047561 | A1* | 3/2004 | Tuda | G02B 6/126 |
| | | | | 385/39 |
| 2004/0184755 | A1* | 9/2004 | Sugiyama | G02B 6/12007 |
| | | | | 385/129 |

(Continued)

FOREIGN PATENT DOCUMENTS

| JP | 5-232417 | 9/1993 |
| JP | 2004-287093 | 10/2004 |

*Primary Examiner* — Akm E Ullah
(74) *Attorney, Agent, or Firm* — Staas & Halsey, LLP (57) ABSTRACT

An optical waveguide includes: a plurality of linear portions arranged in parallel to each other; a plurality of arcuate portions, in the folded portion of the optical waveguide, concentrically arranged about a predetermined center position as a center on the substrate at intervals narrower than intervals between the plurality of linear portions, each of the arcuate portions having a central angle that increases as each of the arcuate portions is closer to the center position; and a plurality of connecting portions respectively connecting the plurality of linear portions and the plurality of arcuate portions, at least one group of the connecting portions bending in a direction opposite to a direction where each of the arcuate portions bends.

9 Claims, 8 Drawing Sheets (56) References Cited

U.S. PATENT DOCUMENTS

| | | | |
|---|---|---|---|
| 2007/0086705 A1* | 4/2007 | Miyadera | G02B 6/125 385/43 |
| 2007/0297720 A1* | 12/2007 | Sugiyama | B82Y 20/00 385/32 |
| 2013/0004123 A1* | 1/2013 | Watanabe | G02B 6/12007 385/31 |

* cited by examiner

OPTICAL MODULATOR WITH AN OPTICAL WAVEGUIDE PARTIALLY FOLDED BACK AND OPTICAL MODULE WITH THE OPTICAL MODULATOR

CROSS-REFERENCE TO RELATED APPLICATION

This application is based upon and claims the benefit of priority of the prior Japanese Patent Application No. 2017-244221, filed on Dec. 20, 2017, the entire contents of which are incorporated herein by reference.

FIELD

The embodiment discussed herein is related to an optical modulator and an optical module.

BACKGROUND

Conventionally, in an optical module equipped with an optical modulator for modulating light, an input optical fiber and an output optical fiber are connected to one side and another side of the optical modulator in series, respectively. However, in the case where the input optical fiber and the output optical fiber are respectively connected to the one side and the other side of the optical modulator, the mounting area of the optical modulator is increased.

Therefore, in the optical module, connecting the input optical fiber and the output optical fiber arranged in parallel, to one side of the optical modulator, sometimes reduces the mounting area.

In the optical module in which the input optical fiber and the output optical fiber arranged in parallel are connected to the one side of the optical modulator, light is redirected between an end of the input optical fiber and an end of the output optical fiber. For example, a portion of an optical waveguide on an optical modulator chip (substrate) is folded back, and by the folded portion of the optical waveguide, a traveling direction of the light is changed by 180° between the end of the input optical fiber and the end of the output optical fiber. By folding back the portion of the optical waveguide, the optical modulator is downsized especially along the longitudinal direction of the substrate, so that a device equipped with the optical modulator can be miniaturized.

However, in the case where the portion of the optical waveguide is folded back, the light is radiated from the folded portion, so that increase in optical loss becomes a problem. For the problem, there is proposed a technique of reducing the light radiated from the folded portion by providing a groove having a refractive index lower than that of the substrate, along the folded portion of the optical waveguide.

Patent Literature 1: Japanese Laid-open Patent Publication No. 2004-287093

Meanwhile, in a case where a portion of an optical waveguide is folded back in an optical modulator, the optical waveguide may include a plurality of linear portions and a plurality of semi-arcuate portions. In this case, the plurality of linear portions is arranged in parallel in a portion other than the folded portion of the optical waveguide, and in the folded portion of the optical waveguide, the plurality of semi-arcuate portions is concentrically arranged around a predetermined center position on a substrate at intervals identical to intervals between the plurality of linear portions. The plurality of linear portions is connected to the plurality of semi-arcuate portions, respectively.

Here, the curvature radius of each semi-arcuate portion is smaller as each semi-arcuate portion is closer to the center position of a concentric circle. Thus, light that is radiated from each semi-arcuate portion increases as each semi-arcuate portion is closer to the center position of the concentric circle. That is, optical loss in the folded portion of the optical waveguide increases as each semi-arcuate portion is closer to the center position of the concentric circle. This increase in optical loss also occurs even in a case where a groove is provided along the folded portion of the optical waveguide.

In view of this, in the folded portion of the optical waveguide, the plurality of semi-arcuate portions is concentrically arranged at intervals narrower than intervals between the plurality of linear portions, and respectively, the plurality of linear portions and the plurality of semi-arcuate portions may be connected via a plurality of connecting portions that bends. In this configuration, since each arcuate portion separates from the center position of the concentric circle, the curvature radius of each semi-arcuate portion that is close to the center position of the concentric circle increases. As a result, it is possible to reduce the optical loss in the folded portion of the optical waveguide.

However, in this configuration in which the plurality of linear portions and the plurality of semi-arcuate portions are respectively connected via the plurality of connecting portions that bends, among the plurality of connecting portions, at least one group of the connecting portions bends in a direction identical to and in a direction opposite to a direction where the plurality of semi-arcuate portions bends. Accordingly, the length of each connecting portion for connecting the plurality of linear portions and the plurality of semi-arcuate portions that is arranged at the intervals narrower than the intervals between the plurality of linear portions increases in the longitudinal direction of the substrate. As a result, there is a possibility that miniaturization of the device may be hindered.

SUMMARY

According to an aspect of an embodiment, an optical modulator includes an optical waveguide formed on a substrate and partially folded back; and a low refractive index portion formed on the substrate along a folded portion of the optical waveguide and having a refractive index lower than a refractive index of the substrate, wherein the optical waveguide includes: a plurality of linear portions arranged in parallel to each other; a plurality of arcuate portions, in the folded portion of the optical waveguide, concentrically arranged around a predetermined center position on the substrate at intervals narrower than intervals between the plurality of linear portions, each of the arcuate portions having a central angle that increases as each of the arcuate portions is closer to the center position; and a plurality of connecting portions respectively connecting the plurality of linear portions and the plurality of arcuate portions, at least one group of the connecting portions bending in a direction opposite to a direction where each of the arcuate portions bends.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the disclosed technique is not limited to the embodiments.

[a] First Embodiment

Figure 1:
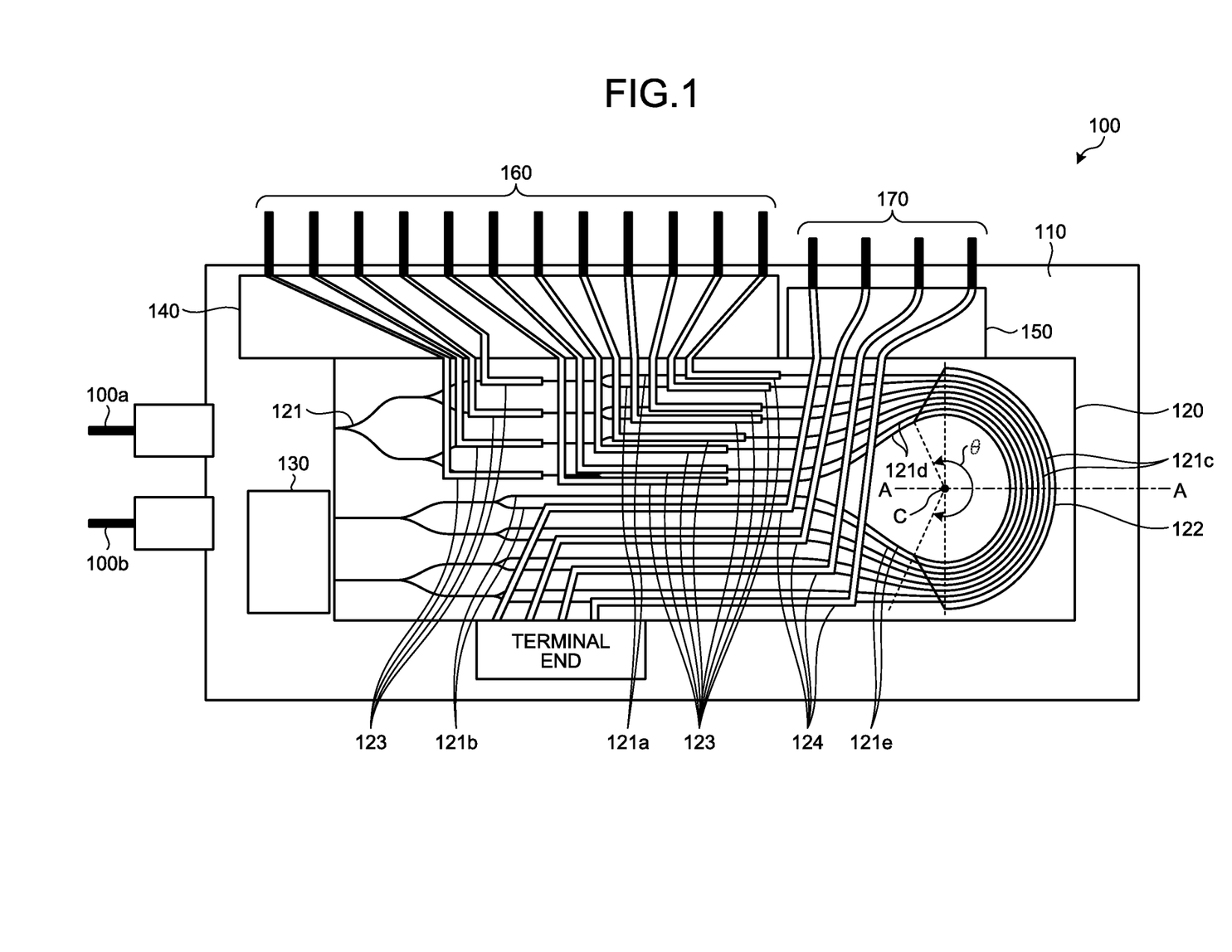
FIG. 1 is a schematic plan view illustrating a configuration of an optical modulator according to a first embodiment.

FIG. 1 is a schematic plan view illustrating a configuration of an optical modulator 100 according to a first embodiment. The optical modulator 100 illustrated in FIG. 1 is connected to an input optical fiber 100a and an output optical fiber 100b arranged in parallel. For example, in the optical modulator 100, light is input from the optical fiber 100a, and signal light is output from the optical fiber 100b. The optical modulator 100 includes a package 110, an optical modulator chip 120, and a polarization beam combiner (PBC) 130. Furthermore, the optical modulator 100 includes a direct current (DC) relay board 140, a radio frequency (RF) relay board 150, a DC terminal 160, and an RF terminal 170.

The package 110 houses various components constituting the optical modulator 100. The package 110 is implemented on a printed circuit board (not illustrated). For example, a driver for generating a high-frequency RF signal and a large scale integration (LSI) for outputting a direct-current DC signal are mounted on the printed circuit board.

The optical modulator chip 120 has an optical waveguide 121, a signal electrode, and a ground electrode, and performs optical modulation to generate an optical signal, while propagating the light input from the optical fiber 100a through the optical waveguide 121. The optical modulator chip 120 includes a DC electrode 123 serving as a signal electrode for the DC signal and an RF electrode 124 serving as a signal electrode for the RF signal. The optical modulator chip 120 performs the optical modulation based on the RF signal supplied from the RF terminal 170 to the RF electrode 124. Furthermore, the optical modulator chip 120 performs phase control and the like of the optical signal based on the DC signal supplied from the DC terminal 160 to the DC electrode 123.

The optical waveguide 121 is formed by forming a metal film containing titanium (Ti) and the like on a portion of a substrate including an electrooptic crystal such as lithium niobate ($LiNbO_3$ (LN)) or lithium tantalate ($LiTaO_3$), and thermally diffusing the metal film. In addition, the signal electrode and the ground electrode are coplanar electrodes formed along the optical waveguide 121. A portion of the optical waveguide 121 is folded back. By the folded portion of the optical waveguide 121, a traveling direction of light is changed by 180° between an end of the optical fiber 100a and an end of the optical fiber 100b. By folding back the portion of the optical waveguide 121, the optical modulator 100 is downsized especially along the longitudinal direction of the substrate (that is, the longitudinal direction of the optical modulator chip 120), so that a device equipped with the optical modulator 100 can be miniaturized. The structure of the optical waveguide 121 will be described in detail later.

Furthermore, the optical modulator chip 120 includes a groove 122 on the substrate along the folded portion of the optical waveguide 121. The groove 122 has a refractive index lower than that of the substrate and reduces light that is radiated from the folded portion of the optical waveguide 121.

Here, the structure of the optical waveguide 121 will be described in detail. As illustrated in FIG. 1, the optical waveguide 121 includes eight linear portions 121a, eight linear portions 121b, eight arcuate portions 121c, eight connecting portions 121d, and eight connecting portions 121e.

The eight linear portions 121a are sequentially branched from one end of the optical waveguide 121 facing the optical fiber 100a and are arranged in parallel to each other in the width direction of the optical modulator chip 120. The eight linear portions 121b are arranged in parallel to each other in the width direction of the optical modulator chip 120, and are sequentially joined to another end of the optical waveguide 121 facing the optical fiber 100b.

In the folded portion of the optical waveguide 121, the eight arcuate portions 121c are concentrically arranged around a predetermined center position C on the substrate at intervals narrower than intervals between the eight linear portions 121a or intervals between the eight linear portions 121b. The central angle θ of each arcuate portion 121c increases as each arcuate portion 121c is closer to the center position C. In the present embodiment, the central angle θ of each arcuate portion 121c is 180° or more, the central angle θ of the arcuate portion 121c farthest from the center position C is 180°, and the central angle θ of the arcuate portion 121c closest to the center position C is the maximum. Hereinafter, the arcuate portion 121c farthest from the center position C is appropriately referred to as "outermost arcuate portion 121c", and the arcuate portion 121c closest to the center position C is appropriately referred to as "innermost arcuate portion 121c".

Among the eight arcuate portions 121c, one end of the outermost arcuate portion 121c is disposed on an extension line obtained by extending the linear portion 121a farthest from the center position C among the eight linear portions

121*a*. Another end of the outermost arcuate portion 121*c* is disposed on an extension line obtained by extending the linear portion 121*b* farthest from the center position C among the eight linear portions 121*b*.

Figure 2:
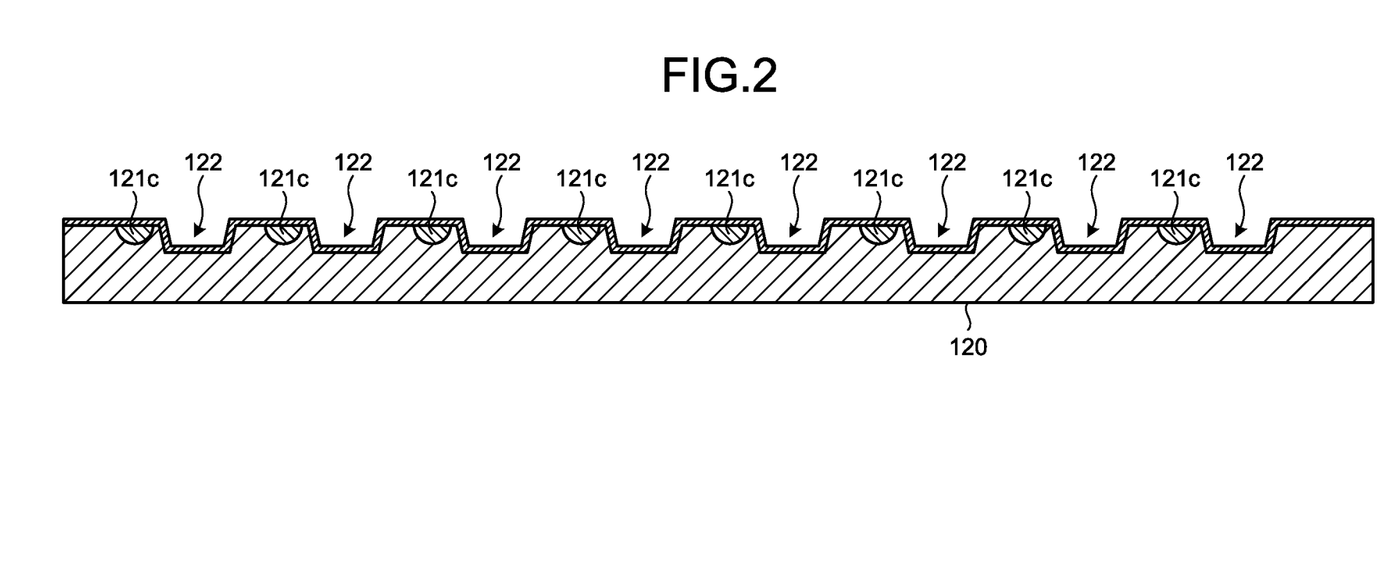
FIG. 2 is a cross-sectional view illustrating a cross section taken along line A-A in FIG. 1.

Furthermore, as illustrated in FIG. 2, the above-described groove 122 is formed on the substrate along the outer periphery of each arcuate portion 121*c*. FIG. 2 is a cross-sectional view illustrating a cross section taken along line A-A in FIG. 1.

Refer back to the explanation of FIG. 1. The eight connecting portions 121*d* respectively connect the eight linear portions 121*a* and the eight arcuate portions 121*c*, and at least one group of the connecting portions 121*d* bends in the direction opposite to a direction where each arcuate portion 121*c* bends. Among the eight connecting portions 121*d*, the connecting portion 121*d* farthest from the center position C is linearly formed along the extension line obtained by extending the linear portion 121*a* farthest from the center position C. That is, the seven connecting portions 121*d* excluding the connecting portion 121*d* farthest from the center position C bend in the direction opposite to the direction where each arcuate portion 121*c* bends. With this configuration, pitch conversion is performed between the eight linear portions 121*a* and the eight arcuate portions 121*c*. Hereinafter, the connecting portion 121*d* farthest from the center position C is appropriately referred to as "outermost connecting portion 121*d*", and the seven connecting portions 121*d* excluding the outermost connecting portion 121*d* are appropriately referred to as "at least one group of the connecting portions 121*d*".

The eight connecting portions 121*e* respectively connect the eight linear portions 121*b* and the eight arcuate portions 121*c*, and at least one group of the connecting portions 121*e* bends in the direction opposite to the direction where each arcuate portion 121*c* bends. Among the eight connecting portions 121*e*, the connecting portion 121*e* farthest from the center position C is linearly formed along the extension line obtained by extending the linear portion 121*b* farthest from the center position C. That is, the seven connecting portions 121*e* excluding the connecting portion 121*e* farthest from the center position C bend in the direction opposite to the direction where each arcuate portion 121*c* bends. With this configuration, pitch conversion is performed between the eight linear portions 121*b* and the eight arcuate portions 121*c*. Hereinafter, the connecting portion 121*e* farthest from the center position C is appropriately referred to as "outermost connecting portion 121*e*", and the seven connecting portions 121*e* excluding the outermost connecting portion 121*e* are appropriately referred to as "at least one group of the connecting portions 121*e*". The structure of the connecting portion 121*d* and the connecting portion 121*e* will be described in detail later.

The PBC 130 combines two optical signals output from the optical modulator chip 120 and outputs an optical signal including two polarized waves of which polarization directions are orthogonal to each other. That is, the PBC 130 rotates the polarization direction of one optical signal output from the optical modulator chip 120 and then combines the optical signal with the other optical signal.

The DC relay board 140 relays the DC signal input from the DC terminal 160, to the optical modulator chip 120, and inputs the DC signal to the DC electrode 123 of the optical modulator chip 120.

The RF relay board 150 relays the RF signal input from the RF terminal 170, to the optical modulator chip 120, and inputs the RF signal to the RF electrode 124 of the optical modulator chip 120.

The DC terminal 160 is a terminal to which a direct-current DC signal output from an LSI is input, for example. On a side surface of the optical modulator 100, for example, a plurality of DC terminals 160 is provided in a row in accordance with the number of the DC electrodes 123 included in the optical modulator chip 120. Phase control and the like of the optical signal that is obtained by the optical modulator chip 120 are performed based on the DC signal input to the DC terminal 160.

The RF terminal 170 is a terminal to which a high-frequency RF signal generated by a driver is input, for example. On the side surface of the optical modulator 100, a plurality of RF terminals 170 is provided in accordance with the number of the RF electrodes 124 included in the optical modulator chip 120. By driving the optical modulator chip 120 based on the RF signal input to the RF terminal 170, an optical signal is obtained by optically modulating light from a light source.

Figure 3A:
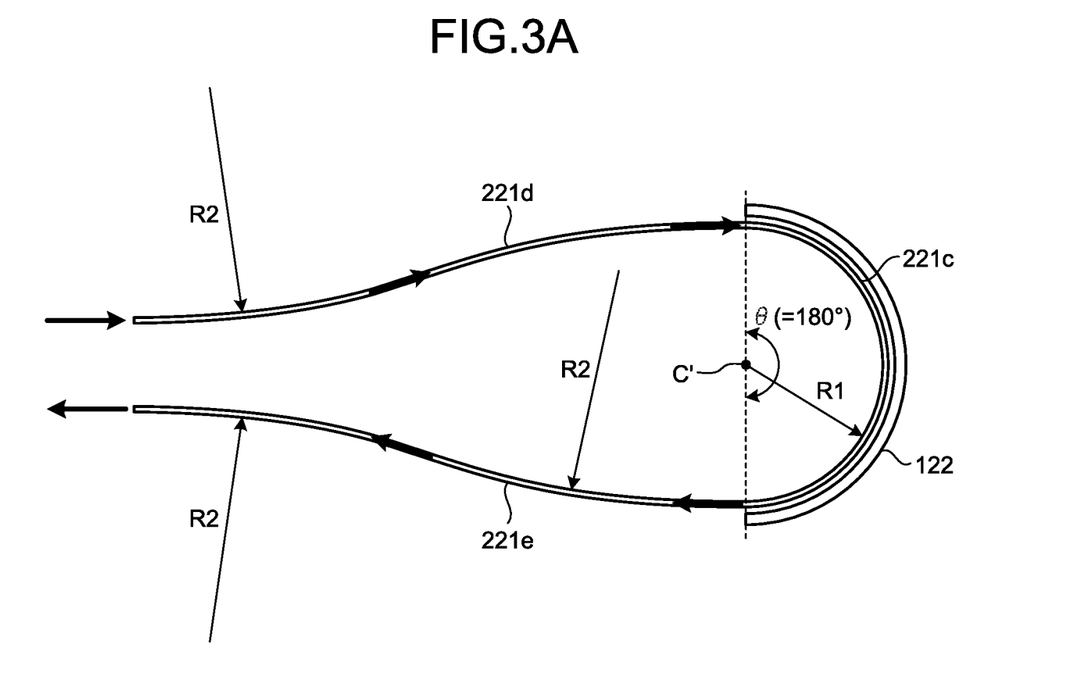
FIG. 3A is a diagram provided for explaining a basic technique.
Figure 3B:
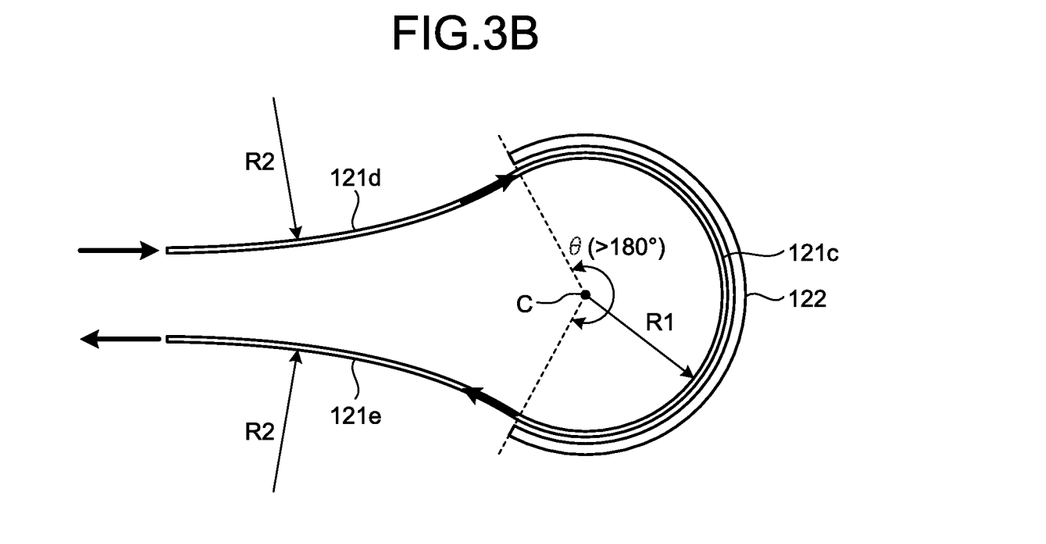
FIG. 3B is a diagram provided for explaining the structure of a connecting portion in the first embodiment.

Here, with reference to FIGS. 3A and 3B, the structure of the connecting portion 121*d* and the connecting portion 121*e* in the present embodiment will be described in detail. First, a basic technique will be described. FIG. 3A is a diagram provided for explaining the basic technique. In the basic technique, it is assumed that eight semi-arcuate portions 221*c* are concentrically arranged around a center position C' at intervals narrower than the intervals between the eight linear portions 121*a*. Furthermore, it is assumed that the eight linear portions 121*a* and the eight semi-arcuate portions 221*c* are connected via eight connecting portions 221*d*, respectively and the eight linear portions 121*b* and the eight semi-arcuate portions 221*c* are connected via eight connecting portions 221*e*, respectively. In the basic technique illustrated in FIG. 3A, among the eight connecting portions 221*d*, at least one group of the connecting portions 221*d* bends at a curvature radius R2 in a direction opposite to a direction where each semi-arcuate portion 221*c* bends, and bends at the curvature radius R2 in the direction identical to the direction where each semi-arcuate portion 221*c* bends. The curvature radius R2 is smaller than a curvature radius R1 of each semi-arcuate portion 221*c*. In the basic technique illustrated in FIG. 3A, among the eight connecting portions 221*e*, at least one group of the connecting portions 221*e* bends at the curvature radius R2 in the direction identical to the direction where each semi-arcuate portion 221*c* bends, and bends at the curvature radius R2 in the direction opposite to the direction where each semi-arcuate portion 221*c* bends.

Subsequently, the structure of the connecting portion 121*d* and the connecting portion 121*e* in the present embodiment will be described. FIG. 3B is a diagram provided for explaining the structure of the connecting portion 121*d* and the connecting portion 121*e* in the first embodiment. In the present embodiment, as illustrated in FIG. 3B, among the eight connecting portions 121*d*, at least one group of the connecting portions 121*d* bends at the curvature radius R2 only in the direction opposite to the direction where each arcuate portion 121*c* bends. Furthermore, in the present embodiment, as illustrated in FIG. 3B, among the eight connecting portions 121*e*, at least one group of the connecting portions 121*e* bends at the curvature radius R2 only in the direction opposite to the direction where each arcuate portion 121*c* bends. With this configuration, at least one group of the connecting portions 121*d* and at least one group of the connecting portions 121*e* bend only in the direction opposite to the direction where each arcuate portion 121*c* bends, so that the length of each connecting portion 121*d* and each connecting portion 121*e* can be suppressed. That is, in the present embodiment, as compared with the basic technique, it is possible to omit a portion bending in the direction identical to the direction where each semi-arcuate portion 221c bends, so that the length of each connecting portion 121d and each connecting portion 121e along the longitudinal direction of the substrate can be shortened by a length of the relevant portion. As a result, the optical modulator chip 120 is downsized especially along the longitudinal direction of the substrate (that is, the longitudinal direction of the optical modulator chip 120), and thus the miniaturization of the optical modulator 100 equipped with the optical modulator chip 120 can be promoted.

As described above, according to the present embodiment, in the folded portion of the optical waveguide, the plurality of arcuate portions is arranged at the narrow intervals such that the central angle of each arcuate portion that is close to the predetermined center position is increased, and the plurality of linear portions and the plurality of arcuate portions are connected via the plurality of connecting portions bending in one direction, respectively. This makes it possible to increase the curvature radius of each arcuate portion that is close to the center position of the concentric circle, and suppress the length of each connecting portion along the longitudinal direction of the substrate. As a result, it is possible to downsize the optical modulator chip along the longitudinal direction of the substrate, while suppressing the optical loss in the folded portion of the optical waveguide, and promote the miniaturization of the optical modulator equipped with the optical modulator chip.

[b] Second Embodiment

The optical modulator according to a second embodiment has the same configuration as the optical modulator 100 according to the first embodiment except for the structure of the connecting portion 121d and the connecting portion 121e. Therefore, in the second embodiment, the same reference numerals are used for constituent elements common to the first embodiment, and a detailed description thereof will be omitted.

Figure 4:
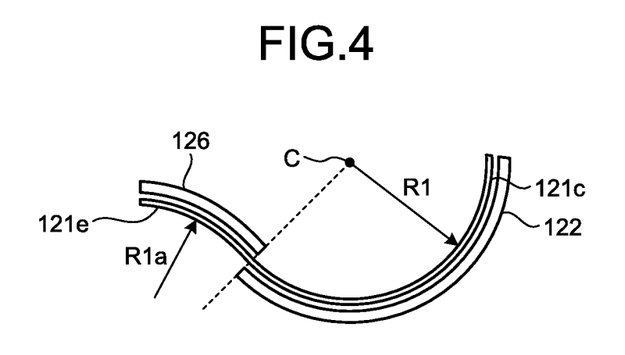
FIG. 4 is a diagram provided for explaining the structure of a connecting portion in a second embodiment.

FIG. 4 is a diagram provided for explaining the structure of the connecting portion 121e in the second embodiment. In FIG. 4, an upper half of the arcuate portion 121c, an upper half of the groove 122, and the connecting portion 121d are omitted for the sake of convenience of explanation. As illustrated in FIG. 4, among the eight connecting portions 121e, at least one group of the connecting portions 121e has a curvature radius smaller than that of each arcuate portion 121c corresponding to the at least one group of the connecting portions 121e. That is, a curvature radius R1a of at least one group of the connecting portions 121e is smaller than the curvature radius R1 of each arcuate portion 121c corresponding to the at least one group of the connecting portions 121e. Furthermore, although not illustrated, among the eight connecting portions 121d, at least one group of the connecting portions 121d has a curvature radius smaller than that of each arcuate portion 121c corresponding to the at least one group of the connecting portions 121e. That is, the curvature radius R1a of at least one group of the connecting portions 121d is smaller than the curvature radius R1 of each arcuate portion 121c corresponding to the at least one group of the connecting portions 121d. This makes it possible to further suppress the length of each connecting portion 121d and the length of each connecting portion 121e along the longitudinal direction of the substrate. As a result, it is possible to further downsize the optical modulator chip 120 along the longitudinal direction of the substrate.

A groove 126 is formed on the substrate along the outer periphery of at least one group of the connecting portions 121e. Furthermore, although not illustrated, the groove 126 is formed on the substrate along the outer periphery of at least one group of the connecting portions 121d. The groove 126 has a refractive index lower than that of the substrate and reduces light that is radiated from at least one group of the connecting portions 121d and at least one group of the connecting portions 121e. Thereby, even in a case where the curvature radius of at least one group of the connecting portions 121d and at least one group of the connecting portions 121e become small, optical loss in at least one group of the connecting portions 121d and at least one group of the connecting portions 121e can be suppressed.

[c] Third Embodiment

The optical modulator according to a third embodiment has the same configuration as the optical modulator 100 according to the first embodiment except for the structure of the groove 122. Therefore, in the third embodiment, the same reference numerals are used for constituent elements common to the first embodiment, and a detailed description thereof will be omitted.

Figure 5:
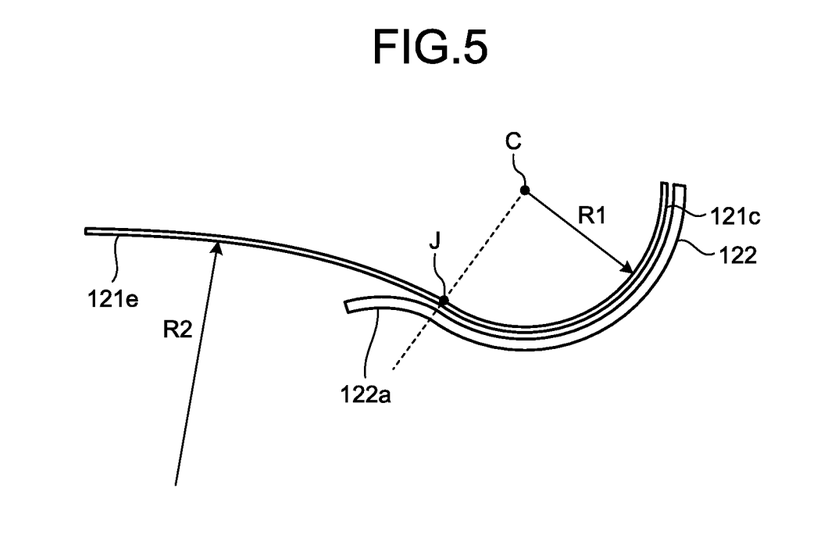
FIG. 5 is a diagram provided for explaining the structure of a groove in a third embodiment.

FIG. 5 is a diagram provided for explaining the structure of the groove 122 in the third embodiment. In FIG. 5, the upper half of the arcuate portion 121c, the upper half of the groove 122, and the connecting portion 121d are omitted for the sake of convenience of explanation. As illustrated in FIG. 5, the groove 122 includes an extending portion 122a in a lower half of the groove 122. The extending portion 122a extends from a position corresponding to a connecting part J between each arcuate portion 121c and each connecting portion 121e, and has a shape that gradually separates from the connecting part J. The groove 122 includes the extending portion 122a, so that light scattered from the connecting part J due to a change in the curvature of the connecting part J between each arcuate portion 121c and each connecting portion 121e can be reduced. As a result, it is possible to suppress optical loss in the connecting part J.

Although not illustrated, the groove 122 includes the extending portion 122a in the upper half of the groove 122. The extending portion 122a extends from a position corresponding to a connecting part K between each arcuate portion 121c and each connecting portion 121d, and has a shape that gradually separates from the connecting part K. Thereby, it is possible to reduce light scattered from the connecting part K due to a change in the curvature of the connecting part K between each arcuate portion 121c and each connecting portion 121d. As a result, it is possible to suppress optical loss in the connecting part K.

[d] Fourth Embodiment

The optical modulator according to a fourth embodiment has the same configuration as that of the third embodiment except for the structure of the connecting portion 121d and the connecting portion 121e. Therefore, in the fourth embodiment, the same reference numerals are used for constituent elements common to the third embodiment, and a detailed description thereof will be omitted.

Figure 6:
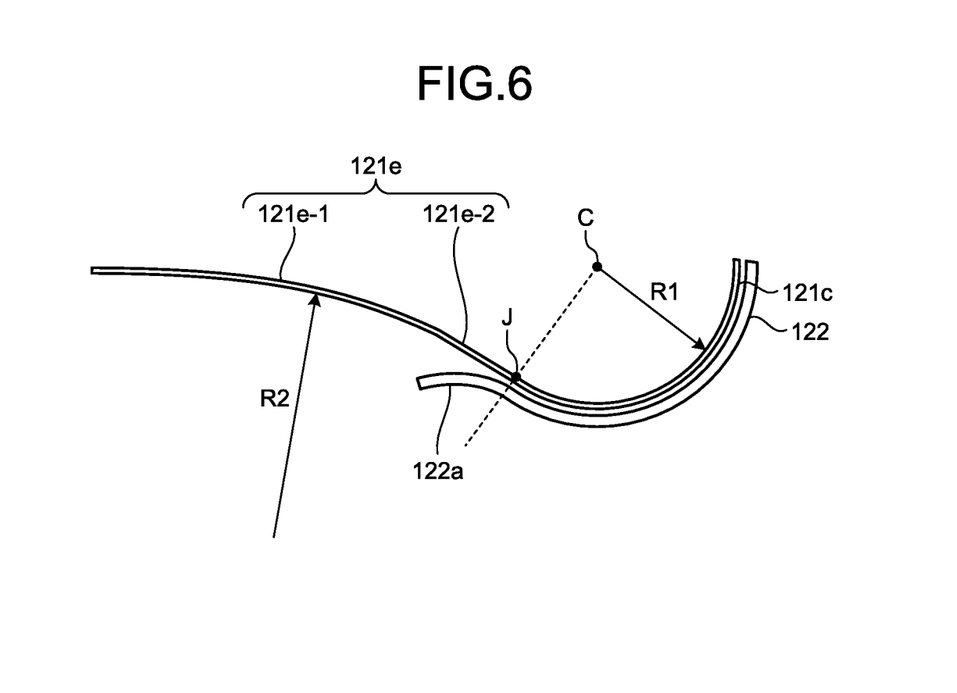
FIG. 6 is a diagram provided for explaining the structure of a connecting portion in a fourth embodiment.

FIG. 6 is a diagram provided for explaining the structure of the connecting portion 121e in the fourth embodiment. In FIG. 6, the upper half of the arcuate portion 121c, the upper half of the groove 122, and the connecting portion 121d are omitted for the sake of convenience of explanation. As illustrated in FIG. 6, among the eight connecting portions 121e, at least one group of the connecting portions 121e includes a bent portion 121e-1 and a linear portion 121e-2. The bent portion 121e-1 bends in the direction opposite to the direction where each arcuate portion 121c corresponding to at least one group of the connecting portions 121e bends. The linear portion 121e-2 is disposed between the bent portion 121e-1 and each arcuate portion 121c corresponding to at least one group of the connecting portions 121e.

The reason why the linear portion 121e-2 is disposed between the bent portion 121e-1 and each arcuate portion 121c corresponding to at least one group of the connecting portions 121e is as follows. That is, in the connecting part J between each arcuate portion 121c and each connecting portion 121e, a shift may occur between the central axis of the mode field of light propagating through each arcuate portion 121c and the central axis of the mode field of light propagating through each connecting portion 121e in some cases. If the amount of the shift between the central axes of the light mode fields increases, light scattered from the connecting part J may increase. Therefore, in the present embodiment, in order to reduce the amount of the shift between the central axes of the light mode fields, the linear portion 121e-2 is disposed between the bent portion 121e-1 and each arcuate portion 121c corresponding to at least one group of the connecting portions 121e. Thereby, the amount of the shift between the central axis of the mode field of the light propagating through each arcuate portion 121c and the central axis of the mode field of the light propagating through each connecting portion 121e is reduced, so that the light scattered from the connecting part J can be reduced. As a result, it is possible to further suppress the optical loss in the connecting part J.

Although not illustrated, among the eight connecting portions 121d, at least one group of the connecting portions 121d includes a bent portion and a linear portion, like the at least one group of the connecting portions 121e. This reduces the amount of the shift between the central axis of the mode field of the light propagating through each arcuate portion 121c and the central axis of the mode field of the light propagating through each connecting portion 121d. Therefore, the light scattered from the connecting part K between each arcuate portion 121c and each connecting portion 121d can be reduced. As a result, it is possible to further suppress the optical loss in the connecting part K.

[e] Fifth Embodiment

The optical modulator according to a fifth embodiment has the same configuration as that of the third embodiment except for the structure of the arcuate portion 121c. Therefore, in the fifth embodiment, the same reference numerals are used for constituent elements common to the third embodiment, and a detailed description thereof will be omitted.

Figure 7:
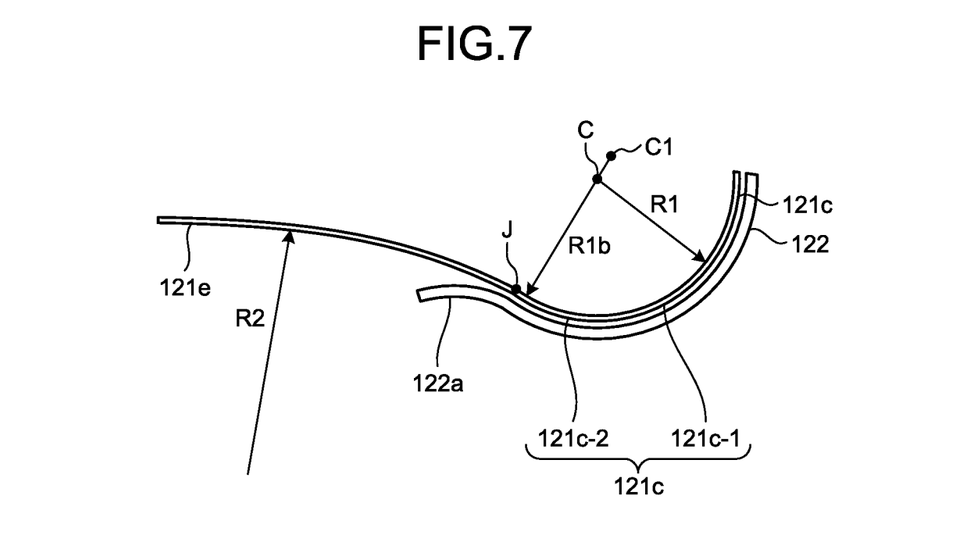
FIG. 7 is a diagram provided for explaining the structure of an arcuate portion in a fifth embodiment.

FIG. 7 is a diagram provided for explaining the structure of the arcuate portion 121c in the fifth embodiment. In FIG. 7, the upper half of the arcuate portion 121c, the upper half of the groove 122, and the connecting portion 121d are omitted for the sake of convenience of explanation. As illustrated in FIG. 7, each arcuate portion 121c includes a bent portion 121c-1 and a bent portion 121c-2 in a lower half of each arcuate portion 121c. The bent portion 121c-1 bends around the center position C at the curvature radius R1. The bent portion 121c-2 is connected to the bent portion 121c-1, bends around another center position C1 on the substrate at a curvature radius R1b larger than the curvature radius R1, and is connected to each connecting portion 121e.

The reason why the bent portion 121c-1 bending at the curvature radius R1b larger than the curvature radius R1 is provided in each arcuate portion 121c is as follows. That is, in the connecting part J between each arcuate portion 121c and each connecting portion 121e, a shift may occur between the central axis of the mode field of light propagating through each arcuate portion 121c and the central axis of the mode field of light propagating through each connecting portion 121e in some cases. If the amount of the shift between the central axes of the light mode fields increases, light scattered from the connecting part J may increase. Therefore, in the present embodiment, in order to reduce the amount of the shift between the central axes of the light mode fields, the bent portion 121c-1 bending at the curvature radius R1b larger than the curvature radius R1 is provided in each arcuate portion 121c. Thereby, the amount of the shift between the central axis of the mode field of the light propagating through each arcuate portion 121c and the central axis of the mode field of the light propagating through each connecting portion 121e is reduced, so that the light scattered from the connecting part J can be reduced. As a result, it is possible to further suppress the optical loss in the connecting part J.

Although not illustrated, each arcuate portion 121c includes the bent portion 121c-1 and the bent portion 121c-2 in the upper half of each arcuate portion. The bent portion 121c-2 is connected to the bent portion 121c-1, bends around the other center position C1 on the substrate at the curvature radius R1b larger than the curvature radius R1, and is connected to each connecting portion 121d. This reduces the amount of the shift between the central axis of the mode field of the light propagating through each arcuate portion 121c and the central axis of the mode field of the light propagating through each connecting portion 121d. Therefore, the light scattered from the connecting part K between each arcuate portion 121c and each connecting portion 121d can be reduced. As a result, it is possible to further suppress the optical loss in the connecting part K.

[f] Sixth Embodiment

The optical modulator according to a sixth embodiment has the same configuration as that of the third embodiment except for the structure of the connecting portion 121d and the connecting portion 121e, and the structure of the arcuate portion 121c. Therefore, in the sixth embodiment, the same reference numerals are used for constituent elements common to the third embodiment, and a detailed description thereof will be omitted.

Figure 8:
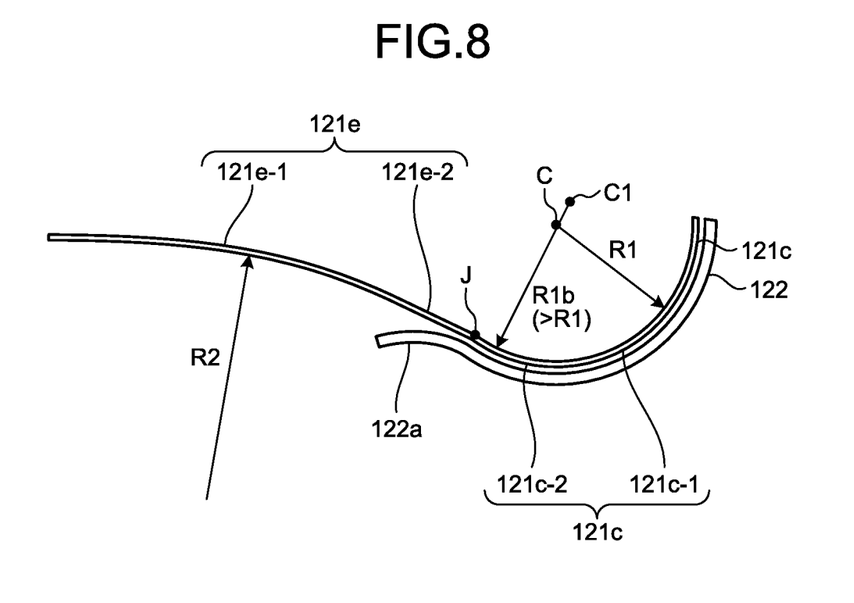
FIG. 8 is a diagram provided for explaining the structure of a connecting portion and the structure of an arcuate portion in a sixth embodiment.

FIG. 8 is a diagram provided for explaining the structure of the connecting portion 121e and the structure of the arcuate portion 121c in the sixth embodiment. In FIG. 8, the upper half of the arcuate portion 121c, the upper half of the groove 122, and the connecting portion 121d are omitted for the sake of convenience of explanation. As illustrated in FIG. 8, among the eight connecting portions 121e, at least one group of the connecting portions 121e includes the bent portion 121e-1 and the linear portion 121e-2. The bent portion 121e-1 bends in the direction opposite to the direction where each arcuate portion 121c corresponding to at least one group of the connecting portions 121e bends. The linear portion 121e-2 is disposed between the bent portion 121e-1 and each arcuate portion 121c corresponding to at least one group of the connecting portions 121e. This reduces the amount of the shift between the central axis of the mode field of the light propagating through each arcuate portion 121c and the central axis of the mode field of the light propagating through each connecting portion 121e. Therefore, it is possible to reduce the light scattered from the connecting part J between each arcuate portion 121c and each connecting portion 121e. As a result, it is possible to further suppress the optical loss in the connecting part J.

Although not illustrated, among the eight connecting portions 121d, at least one group of the connecting portions 121d includes a bent portion and a linear portion, like the at least one group of the connecting portions 121e. This reduces the amount of the shift between the central axis of the mode field of the light propagating through each arcuate portion 121c and the central axis of the mode field of the light propagating through each connecting portion 121d. Therefore, the light scattered from the connecting part K between each arcuate portion 121c and each connecting portion 121d can be reduced. As a result, it is possible to further suppress the optical loss in the connecting part K.

Each arcuate portion 121c includes the bent portion 121c-1 and the bent portion 121c-2 in the lower half of each arcuate portion 121c. The bent portion 121c-1 bends around the center position C at the curvature radius R1. The bent portion 121c-2 is connected to the bent portion 121c-1, bends around the other center position C1 on the substrate at the curvature radius R1b larger than the curvature radius R1, and is connected to each connecting portion 121e. This reduces the amount of the shift between the central axis of the mode field of the light propagating through each arcuate portion 121c and the central axis of the mode field of the light propagating through each connecting portion 121e. Therefore, it is possible to reduce the light scattered from the connecting part J between each arcuate portion 121c and each connecting portion 121e. As a result, it is possible to further suppress the optical loss in the connecting part J.

Although not illustrated, each arcuate portion 121c includes the bent portion 121c-1 and the bent portion 121c-2 in the upper half of each arcuate portion. The bent portion 121c-2 is connected to the bent portion 121c-1, bends around the other center position C1 on the substrate at the curvature radius R1b larger than the curvature radius R1, and is connected to each connecting portion 121d. This reduces the amount of the shift between the central axis of the mode field of the light propagating through each arcuate portion 121c and the central axis of the mode field of the light propagating through each connecting portion 121d. Therefore, the light scattered from the connecting part K between each arcuate portion 121c and each connecting portion 121d can be reduced. As a result, it is possible to further suppress the optical loss in the connecting part K.

[g] Seventh Embodiment

The optical modulator according to a seventh embodiment has the same configuration as that of the fourth embodiment except for the structure of the arcuate portion 121c. Therefore, in the seventh embodiment, the same reference numerals are used for constituent elements common to the fourth embodiment, and a detailed description thereof will be omitted.

Figure 9:
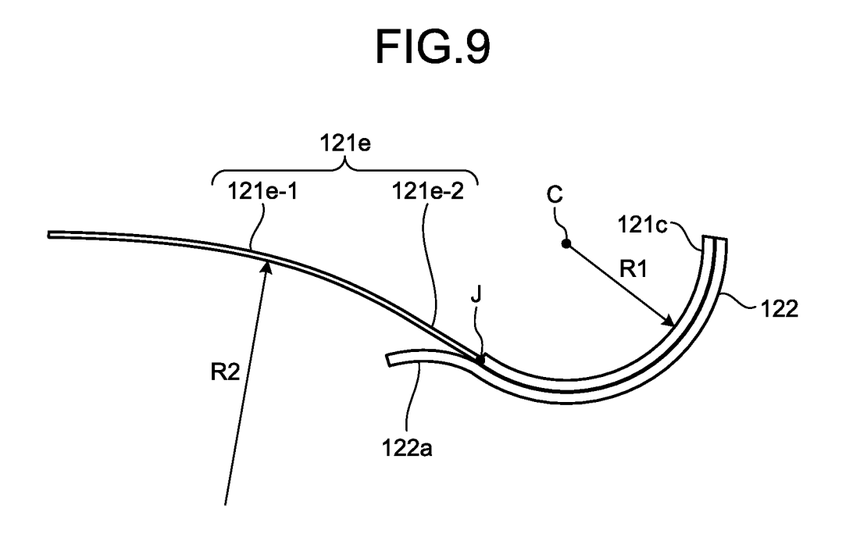
FIG. 9 is a diagram provided for explaining the structure of an arcuate portion in a seventh embodiment.

FIG. 9 is a diagram provided for explaining the structure of the arcuate portion 121c in the seventh embodiment. In FIG. 9, the upper half of the arcuate portion 121c, the upper half of the groove 122, and the connecting portion 121d are omitted for the sake of convenience of explanation. As illustrated in FIG. 9, the width of each arcuate portion 121c is larger than the width of another portion (for example, each connecting portion 121e) in the optical waveguide 121. Thereby, it is possible to enhance light confinement in each arcuate portion 121c, and thus, optical loss in each arcuate portion 121c can be further suppressed.

[h] Eighth Embodiment

The optical modulator according to an eighth embodiment has the same configuration as that of the seventh embodiment except for the structure of the connecting portion 121d and the connecting portion 121e, and the structure of the arcuate portion 121c. Therefore, in the eighth embodiment, the same reference numerals are used for constituent elements common to the seventh embodiment, and a detailed description thereof will be omitted.

Figure 10:
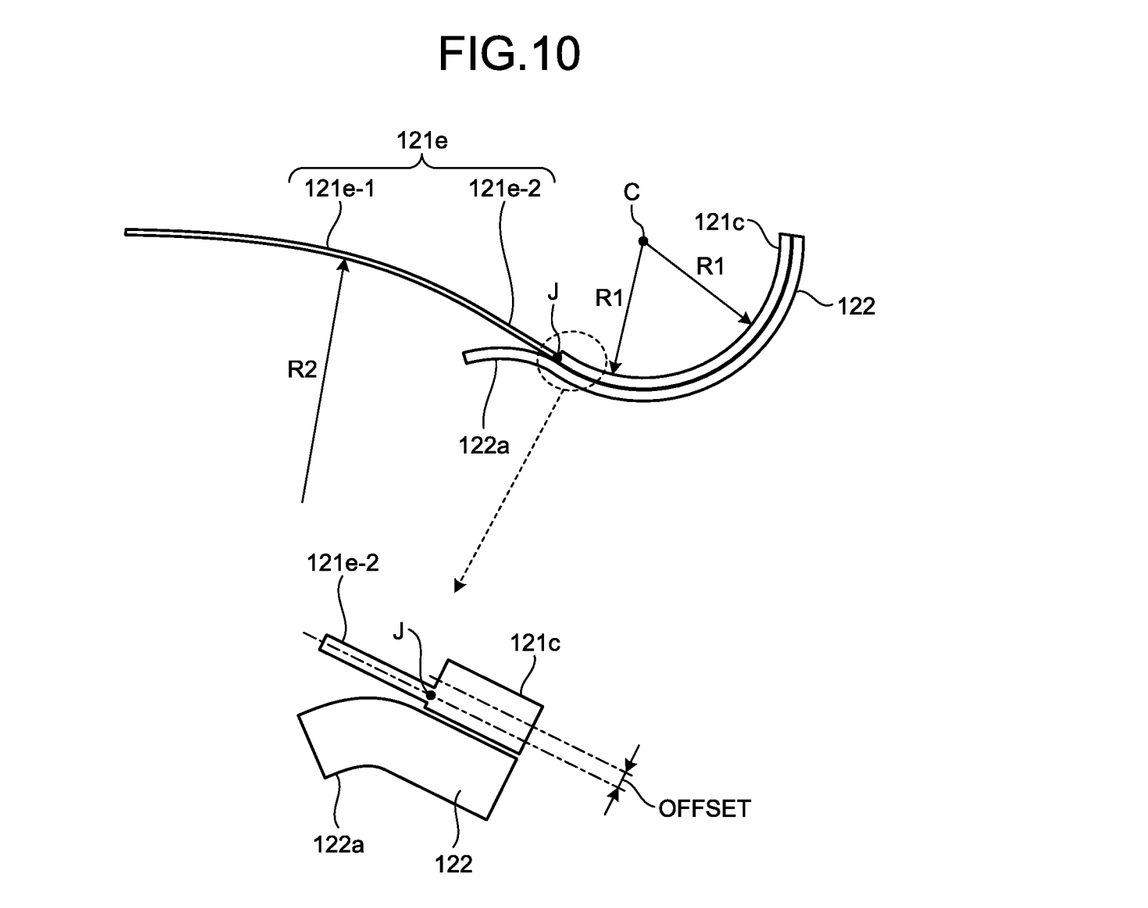
FIG. 10 is a diagram provided for explaining the structure of a connecting portion and a structure of an arcuate portion in an eighth embodiment.

FIG. 10 is a diagram provided for explaining the structure of the connecting portion 121e and the structure of the arcuate portion 121c in the eighth embodiment. In FIG. 10, the upper half of the arcuate portion 121c, the upper half of the groove 122, and the connecting portion 121d are omitted for the sake of convenience of explanation. Furthermore, in FIG. 10, the configuration near the connecting part J between each arcuate portion 121c and each connecting portion 121e is enlarged. The central axis of each connecting portion 121e and the central axis of each arcuate portion 121c corresponding to each connecting portion 121e are offset such that the central axis of the mode field of the light propagating through each connecting portion 121e agrees with the central axis of the mode field of the light propagating through each arcuate portion 121c. Thereby, the central axis of the mode field of the light propagating through each arcuate portion 121c agrees with the central axis of the mode field of the light propagating through each connecting portion 121e, so that the light scattered from the connecting part J can be reduced. As a result, it is possible to further suppress the optical loss in the connecting part J.

Although not illustrated, the central axis of the connecting portion 121d and the central axis of each arcuate portion 121c corresponding to each connecting portion 121d are offset such that the central axis of the mode field of the light propagating through each connecting portion 121d agrees with the central axis of the mode field of the light propagating through each arcuate portion 121c. Thereby, the central axis of the mode field of the light propagating through each arcuate portion 121c agrees with the central axis of the mode field of the light propagating through each connecting portion 121d, so that the light scattered from the connecting part K between each arcuate portion 121c and each connecting portion 121d can be reduced. As a result, it is possible to further suppress the optical loss in the connecting part K.

Figure 11:
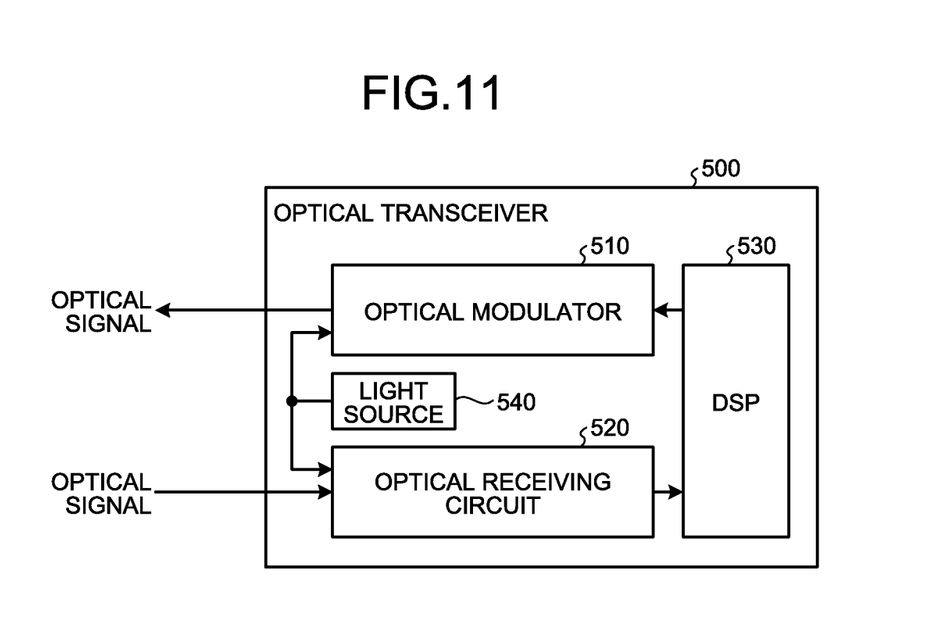
FIG. 11 is a block diagram illustrating a configuration example of an optical transceiver.

The optical modulator described in each of the above embodiments can be applied to an optical module such as an optical transceiver that transmits and receives an optical signal, for example. FIG. 11 is a block diagram illustrating a configuration example of an optical transceiver 500. The optical transceiver 500 illustrated in FIG. 11 includes an optical modulator 510, an optical receiving circuit 520, a digital signal processor (DSP) 530, and a light source 540.

The optical modulator 510 is the optical modulator described in each of the above embodiments, and has a configuration in which a driver (not illustrated) is coupled to the optical modulator 510. The optical modulator 510 and the driver are coupled via, for example, a flexible printed circuits (FPC), and an RF signal output from the driver is input from the RF terminal 170 to the optical modulator 510. The optical modulator 510 optically modulates light from the light source 540 and outputs an optical signal to, for example, an optical fiber or the like.

The optical receiving circuit 520 receives the optical signal, makes the received optical signal interfere with the light from the light source 540 to execute predetermined optical reception processing such as photoelectric conversion, and outputs an obtained reception signal to the DSP 530.

The DSP 530 executes various types of digital signal processing such as digital demodulation and decoding on the reception signal output from the optical receiving circuit 520. In addition, the DSP 530 executes various types of digital signal processing such as encoding and digital modulation on transmission data, and outputs an obtained transmission signal to the driver coupled to the optical modulator 510. The transmission signal is converted by the driver into an RF signal for modulating the light, and drives the optical modulator 510.

According to one embodiment of the optical modulator disclosed in the present application, it is possible to promote miniaturization while suppressing the optical loss in the folded portion of the optical waveguide.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulator comprising:
   an optical waveguide formed on a substrate and partially folded back; and
   a low refractive index portion formed on the substrate along a folded portion of the optical waveguide and having a refractive index lower than a refractive index of the substrate,
   wherein the optical waveguide includes:
   a plurality of linear portions arranged in parallel to each other;
   a plurality of arcuate portions, in the folded portion of the optical waveguide, concentrically arranged around a predetermined center position on the substrate at intervals narrower than intervals between the plurality of linear portions, each of the arcuate portions having a central angle and curvature radius that increase as each of the arcuate portions is closer to the center position; and
   a plurality of connecting portions respectively connecting the plurality of linear portions and the plurality of arcuate portions, at least one group of the connecting portions bending only in a direction opposite to a direction where each of the arcuate portions bends, and
   the low refractive index portion is formed on the substrate along an outer periphery of each of the arcuate portions and has an extending portion extending from a position corresponding to a connecting part between each of the arcuate portions and each of the connecting portions, the low refractive portion having a shape that gradually separates from the connecting part.

2. The optical modulator according to claim 1,
   wherein, among the plurality of arcuate portions, one end of an arcuate portion farthest from the center position is disposed on an extension line obtained by extending the linear portion farthest from the center position among the plurality of linear portions, and
   among the plurality of connection portions, a connecting portion farthest from the center position is linearly formed along the extension line.

3. The optical modulator according to claim 1, wherein the at least one group of the connecting portions has a curvature radius smaller than a curvature radius of each of the arcuate portions corresponding to the at least one group of the connecting portions.

4. The optical modulator according to claim 1, further comprising another low refractive index portion formed on the substrate along an outer periphery of the at least one group of the connecting portions, the other low refractive index portion having a refractive index lower than the reflective index of the substrate.

5. The optical modulator according to claim 1,
   wherein the at least one group of the connecting portions includes:
   a bent portion bending in the direction opposite to the direction where each of the arcuate portions corresponding to the at least one group of the connecting portions bends; and
   a linear portion disposed between the bent portion and each of the arcuate portions corresponding to the at least one group of the connecting portions.

6. The optical modulator according to claim 1,
   wherein each of the arcuate portions includes:
   a first bent portion bending around the center position at a first curvature radius; and
   a second bent portion connected to the first bent portion, the second bend portion bending around another center position at a second curvature radius larger than the first curvature radius, the second bent portion being connected to each of the connecting portions.

7. The optical modulator according to claim 1, wherein a width of each of the arcuate portions is larger than a width of another portion of the optical waveguide.

8. The optical modulator according to claim 1, wherein a central axis of each of the connecting portions and a central axis of each of the arcuate portions corresponding to each of the connecting portions are offset such that a central axis of a mode field of light propagating through each of the connecting portions agrees with a central axis of a mode field of light propagating through each of the arcuate portions.

9. An optical module comprising the optical modulator according to claim 1.

* * * * *